3,644,417
CORONARY VASODILATOR COMPOUNDS

Abraham Weber, Paris, Jacques Frossard, Champigny, and Daniel Bouzard, Franconville, France, assignors to Mead Johnson & Company, Evansville, Ind.
No Drawing. Filed July 2, 1969, Ser. No. 838,671
Int. Cl. C07d 93/42; A61k 27/00
U.S. Cl. 260—327 B          3 Claims

ABSTRACT OF THE DISCLOSURE 5,5-dioxo-6-methyl-11 - [13 - (N-methyl-N-(1-phenyl-2-propyl)amino)propyl]dibenzo[1,2,5]thiadiazepine possesses coronary vasodilator action and freedom from side effects such as tachycardia and sedative action.

FIELD OF THE INVENTION

This invention provides a novel heterocyclic alkylamino compound of the dibenzo[1,2,5]thiadiazepine class. The substance is a unique member of the class in that it possesses a high degree of coronary vasodilator activity. The invention also refers to physiologic processes for effecting coronary vasodilator action in a mammal by administration of this compound.

DESCRIPTION OF THE PRIOR ART

U.S. Pat. No. 3,268,557, of the same Abraham Weber identified as co-inventor of this invention and granted Aug. 23, 1966, refers to 5,5-dioxodibenzo[1,2,5]thiadiazepine as the parent member of a novel class of heterocyclic compounds. U.S. Pat. No. 3,274,058, granted Sept. 20, 1966, and U.S. Pat. No. 3,322,789, granted May 30, 1967, the former of the same Abraham Weber and the latter of William E. Kreighbaum, refer to related groups of 11-substituted aminoalkyl derivatives of the foregoing heterocycle. The known 11-substituted aminoalkyl derivatives have the following formula in which the numbered ring positions are shown for nomenclature purposes.

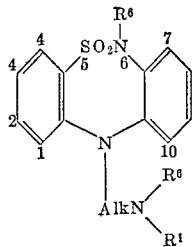

Formula I

In the prior art compounds of Formula I, $R^1$, $R^2$ and $R^6$ represent lower alkyl, or hydroxy lower alkyl groups having up to four carbon atoms or altenatively one of $R^1$ and $R^2$ may be hydrogen or they may be joined to form a heterocyclic group such as piperidino, morpholino, pyrrolidino, piperazino, or thiamorpholino. Alk in the prior art represents an alkylene group having two to four carbon atoms. Psychotropic and muscle relaxant properties have been attributed to these substances.

SUMMARY OF THE INVENTION

It has now been found that 5,5-dioxo-6-methyl-11-[3-(N-methyl - N-(1 - phenyl - 2 - propyl)amino)propyl] dibenzo[1,2,5]thiadiazepine and its pharmaceutically acceptable salts possess coronary vasodilator action. This is the substance of Formula I in which $R^6$ is methyl, Alk is trimethylene, and $R^1R^2N$- is the N,α-dimethylphenethylamino group. This substance when administered intravenously to dogs in doses of 0.5 to 2.5 mg./kg. of body weight increases coronary flow from 90 to 200%. It is thus apparent that it is a compound of substantial activity, being more active than the known coronary vasodilator, prenylamine. The compound of the present invention has the further advantage of exerting little effect on pulse rate or blood pressure when administered in doses exerting the foregoing effect on coronary blood flow. In addition it possesses little adrenergic blocking action and little central nervous system depressant or sedative action. Its toxicity is quite low, $LD_{50}$ 1400 mg./kg. when administered to mice orally.

When pharmaceutically acceptable acid addition salts are referred to herein, what is meant is the salts of 5,5-dioxo-6-methyl - 11-[3-(N-methyl-N-(1-phenyl-2-propyl) amino)propyl]dibenzo[1,2,5]thiadiazepine in which the anion does not contribute significantly to the toxicity or pharmacological effect of the compound when employed according to the present invention. Examples of some pharmaceutically acceptable salts are the acetate, propionate, butyrate, pamoate, tannate, mucate, citrate, malate, ascorbate, tosylate, mesylate, phosphate, nitrate, sulfate, hydrobromide, hydroiodide, hydrochloride, etc. The compound of the present invention and its pharmaceutically acceptable salts may be administered orally or parenterally to a mammalian host in which it is desired to effect coronary vasodilation. Doses employed are in the range of 0.1 to 20 mg./kg. of the subject.

Detailed procedures illustrating two variations of the process for preparing the present substance appear below. The present process involves reacting an alkali metal salt of 5,5-dioxo-6-methyldibenzo[1,2,5]thiadiazepine with the appropriate N,N-disubstituted-3-aminopropyl chloride. The N-substituents are the methyl group and the 1-phenyl-2-propyl group. This substituted 3-aminopropyl chloride is prepared from the corresponding 3-aminopropanol which in turn is obtained by reacting 3-chloropropanol with N,α-dimethylphenethylamine. 3-[N-methyl-N-(1-phenyl-2-propyl)amino] - 1 - propanol can also be prepared by the reductive alkylation of 3-(N-methylamino)propanol with benzylmethyl ketone.

In any event regardless of how the starting N,N-disubstituted aminopropyl chloride is obtained, the process is carried out by first reacting 5,5-dioxo-6-methyldibenzo [1,2,5]-thiadiazepine with one molecular proportion of a strong alkali metal base in an inert liquid reaction medium to form the alkali metal salts thereof. Suitable bases include sodium hydride, sodium amide, lithium amide, sodium ethoxide, potassium t-butoxide, metallic sodium, etc. Suitable liquid reaction media include dimethylformamide, toluene, dibutyl ether, xylene, tetrahydrafuran, etc. The reaction with the aminopropyl halide reactant is preferably carried out after formation of the sodium salt in the same reaction medium by simply adding the halide reactant to the reaction mixture and heating at from 80° C. to 150° C. until the reaction is complete. Periods from one to eight or ten hours may be required depending upon the size of the batch and the equipment being used.

If desired, 5,5-dioxo-6-methyldibenzo[1,2,5]thiadiazepine may be converted to its alkali metal salt as described in the preceding paragraph and then allowed to react with trimethylene chlorobromide to provide 11-(3-chloropropyl) - 5,5 - dioxo - 6 - methyldibenzo[1,2,5]thiadiazepine which in turn may be caused to react with N,α- dimethylphenethylamine in a refluxing solvent such as ethanol, methanol, propanol, ethyl acetate, methyl ethyl ketone, benzene, xylene, tetrahydrofuran or dibutyl ether to provide the desired product identical in all respects with that prepared as described above.

To summarize the foregoing, the process for preparing the compound of the present invention involves the unitary concept of reacting a reactive ester of the formula $ACH_2CH_2CH_2X$ or $BCH_2CH_2CH_2X$ with an amine of the formula AH or BH to provide a product of the formula $ACH_2CH_2CH_2B$. A and B refer to 5,5-dioxo-6-methyldibenzo[1,2,5]thiadiazepine and N,α - dimethylphenylamine respectively. The term reactive ester group X, preferably refers to the halogens, chlorine, bromine, iodine, but also includes sulfate, phosphate, alkyl sulfate or dialkyl phosphate wherein the alkyl groups have 1 to 6 carbon atoms, alkanesulfonate, or arylsulfonate such as the methanesulfonate and p-toluene sulfonate groups. Such are well known to organic chemistry as leaving groups in electrophylic substitution reactions for the introduction of alkyl substituents into amines and other electron species. When the amine reactant is 5,5-dioxo-6-methyldibenzo[1,2,5]thiadiazepine, it is preferred to first form an alkali metal salt thereof at the 11-position before reaction with the reactive ester. This is readily accomplished by reaction of the heterocycle with an alkali metal base under anhydrous conditions preferably in an inert liquid reaction medium as has been indicated above.

DESCRIPTION OF PREFERRED EMBODIMENTS

Procedure.—3-[N-methyl-N-(1-phenyl-2-propyl) amino]-1-propanol

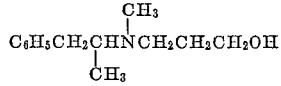

A mixture of 90 grams (0.48 mole) of N,α-dimethylphenylamine, 142 grams (0.67 mole) of 3-chloropropanol, and 145 ml. of pyridine in 300 ml. of toluene was heated at the reflux temperature with stirring for 8 hours. After cooling to room temperature, the reaction mixture was washed with 500 ml. of aqueous 10% sodium hydroxide and then dried over anhydrous potassium carbonate. The solvent was removed by distillation and the residue distilled in vacuo to provide the desired amine, boiling point 173–175° C./15 mm. Hg. The oxalate salt was prepared and crystallized from ethanol, melting point 119° C.

Analysis.—Calc'd for $C_{15}H_{23}NO_5$ (percent): C, 60.59; H, 7.80; N, 4.71. Found (percent): C, 60.54; H, 7.85; N, 4.78.

Procedure 2.—N-methyl-N-(1-phenyl-2-propyl)-3-chloropropylamine hydrochloride

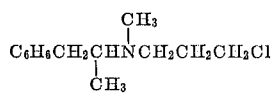

A solution of 42 g. of the carbinol prepared by Procedure 1 in 84 ml. of anhydrous chloroform was treated with an equimolar portion of anhydrous hydrogen chloride. The mixture was then treated with a solution of 90 ml. of thionyl chloride in 90 ml. of chloroform and then heated at reflux for 2 hrs. The solvent was removed by distillation and the residue dried by triturating with anhydrous ether and decanting; yield 52 g. M.P. 144–145° C. A sample recrystallized from isopropanol exhibited M.P. 147° C.

Analysis.—Calc'd for $C_{15}H_{22}ClN \cdot HCl$ (percent): C, 59.54; H, 8.07 N, 5.34. Found (percent): C, 59.49; H, 8.07; N, 5.32.

Procedure 3.—5,5 - dioxo - 6 - methyl - 11 - [3 - (N-methyl - N - (1 - phenyl - 2 - propyl)amino)propyl] dibenzo[1,2,5]thiadiazepine

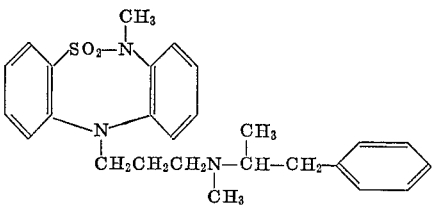

(a) Preparation via N-methyl-N-(1-phenyl-2-propyl)-3 - chloropropylamine.—6 - methyl - 5,5 - dioxodibenzo-[1,2,5]thiadiazepine, 295 g. (0.88 mole) was dissolved in 2.7 l. of anhydrous dimethylformamide and treated under an atmosphere of nitrogen with 177 g. of a 50% suspension of sodium hydride in mineral oil. The solution was then cooled while 516 g. (2 moles) of the product of Procedure 2 was added thereto and the mixture was then stirred for 8 hours at 100 C. The reaction mixture was then cooled, diluted with 5 l. of water and stirred until crystallization was complete. The crystalline material was collected on a filter and washed with water, M.P. 82° C. This material was recrystallized from ethanol, yield 480 g., M.P. 83–84° C.

Analysis.—Calc'd for $C_{26}H_{31}O_3S_2$ (percent): C, 69.45; H, 6.95; N, 9.34. Found (percent): C, 69.34; H, 6.79; N, 9.40.

NMr, CDCL$_3$ solution with tetramethylsilane as internal standard, chemical shifts reported as parts per million: doublet of doublets 7.89 (1 proton), complex multiplet 7.3 (7 protons), singlet 3.37 (3 protons), singlet 2.22 (3 protons), doublet (J=6.1 c.p.s.) 0.94 (3 protons), multiplet 3.74 (2 protons), multiplet 1.6 (2 protons), complex multiplet (5 protons) 2.1–3.0. Infrared absorption maxima (0.5% KBr); 3035, 2970, 2940, 2870, 2810, 1592, 1500, 1480, 1330, 1153, 760, 700, 600, and 580 cm.$^{-1}$.

The hydrochloride salt was prepared by dissolving a portion of the foregoing base in 4 ml. of warm ethanol per gram of base and adding concentrated aqueous hydrochloric acid to an apparent pH value of 1. The mixture was then diluted with 4 ml. of water per gram of base employed and the solution set aside over night to permit crystallization to occur. The crystalline hydrochloride was collected by filtration, washed on the filter with 50% aqueous ethanol, and air dried; M.P. 132–134° C. A sample was dried at 127–130° C. for 10 minutes prior to analysis.

Analysis.—Calc'd for $C_{26}H_{31}N_3O_2S \cdot HCl$ (percent): C, 64.24; H, 6.63; N, 8.64. Found (percent): C, 63.81; H, 6.39; N, 8.55.

NMr CDCl$_3$ solution with tetramethylsilane as internal standard, chemical shifts reported as parts per million: broad singlet 11.9 (1 proton), doublet of doublets 8.0 (1 proton), complex multiplet 7.3 (7 proton), singlet 3.24 (3 protons), doublet (J=5.0 c.p.s.) 2.63 (3 protons), pair of doublets (J=6.8 c.p.s.) 1.16 (3 protons), multiplet 4.12 (2 protons), complex multiplet 2.0–3.8 (7 protons). Infrared absorption maxima (0.5% in KBr): 3130, 2945, 2890, 2640, 2480, 1590, 1500, 1475, 1328, 1150, 765, 700, 600, and 580 cm.$^{-1}$.

(b) Preparation via 11-(3-chloropropyl)-5,5-dioxo-6-methyldibenzo[1,2,5]thiadiazepine.—5,5 - Dioxo-6-methyldibenzo[1,2,5]thiadiazepine, 5.2 g. (0.02 mole) was dissolved in dimethylformamide and treated with 2.5 g. (0.05 mole) of a 50% suspension of sodium hydride in mineral oil. Trimethylene chlorobromide, 15.7 g. (0.1 mole) was then added dropwise to the reaction mixture. After the exothermic reaction had subsided the mixture was heated at 100°C. for 1 hr. with stirring. An additional 1 g. of sodium hydride was then added and a further 0.1 mole portion of trimethylene chlorobromide and the mixture was again heated for 5 hrs. at 100° C. The resulting intermediate compound was recovered from the reaction mixture after cooling to room temperature by treatment with water and extraction with ether. It was collected by filtration and recrystallized from isopropanol, 4.6 g. M.P. 115° C. This material was then heated at the reflux temperature for 12 hours with a solution of 3 ml. of N,α-dimethylphenethylamine in 30 ml. of ethanol. The solvent and excess dimethylphenethylamine were removed by distillation in vacuo and the residue was dissolved in ether and converted to the hydrochloride salt by treatment of the filtered ether solution with 5 N hydrochloric acid as described in Procedure 3a.

What is claimed is:

1. 5,5-dioxo-6-methyl-11-[3-(N-methyl-N-(1 - phenyl-2 - propyl)amino)propyl]dibenzo[1,2,5]thiadiazepine or the pharmaceutically acceptable acid addition salts thereof.

2. 5,5-dioxo-6-methyl-11-[3-(N-methyl-N-(1 - phenyl-2-propyl)amino)propyl]dibenzo[1,2,5]thiadiazepine.

3. 5,5-dioxo-6-methyl-11-[3-(N-methyl-N-(1 - phenyl-2 - propyl)amino]dibenzo[1,2,5]thiadiazepine hydrochloride.

References Cited

UNITED STATES PATENTS 3,274,058   9/1966   Weber _____ 260—327

OTHER REFERENCES

Morrison et al.: Org. Chem. (Allyn & Bacon, Boston, 1959), pp. 540–1.

HENRY R. JILES, Primary Examiner

C. M. SHURKO, Assistant Examiner

U.S. Cl. X.R.

424—275